Aug. 30, 1938.      H. E. IVES      2,128,676
COLOR CHART AND METHOD OF MAKING THE SAME

Filed Dec. 7, 1935

INVENTOR
Herbert E. Ives
BY Robert W. Byerly
ATTORNEY

Patented Aug. 30, 1938

2,128,676

UNITED STATES PATENT OFFICE 2,128,676

COLOR CHART AND METHOD OF MAKING THE SAME

Herbert E. Ives, Upper Montclair, N. J., assignor to Interchemical Corporation, Cincinnati, Ohio, a corporation of Ohio Application December 7, 1935, Serial No. 53,303

16 Claims. (Cl. 41—6)

This invention relates to a color chart and to a method of making the same, and aims to provide a convenient and easily made color chart to serve as a guide in the use of a three-color palette.

To apply the principle that all colors of the spectrum may be produced by mixtures of red, green and blue light to the mixing of three colored pigments, it is necessary to select three pigments which absorb respectively narrow spectral bands of blue, green and red light. All hues of the spectrum may be matched by the use of such pigments and mixtures of pairs of them.

The color chart which I have invented as a guide for mixing such pigments has the form of a regular hexagon. Around the peripheral portion of the hexagon is a series of colors varying regularly in hue, and along the radii of the hexagon are series of colors of the same hue varying regularly in strength or density. The series of colors around the periphery contains those colors which may be made by mixing together in different proportions any two of a set of three colored pigments which absorb blue, green and red light respectively. These colors are the colors of maximum strength and maximum intensity which can be obtained from the set of pigments and are referred to herein as "pure colors". The pure colors produced by each one of the three pigments separately are shown at three spaced corners of a hexagon, and the pure colors which can be produced by mixing any two of the pigments in various proportions are shown in a regular series extending along the periphery between the two corners at which the colors of these two pigments are shown.

The center of the hexagon is white. The body of the hexagon between its peripheral portion and its center is so colored that a line from any point on the periphery to the center contains a graduated series of the colors produced by mixing regularly varying proportions of white with the colored pigment mixture which forms the pure color shown at the end of the line.

The important advantage of my color chart lies in the fact that the peripheral variation in hue and the radial variation in strength may be simultaneously produced by three overlapping color impressions, each of which varies in density in one direction only.

A detailed description of the invention will be given in connection with the accompanying drawing in which colors are represented by an arbitrary system which has been selected because of the fact that it makes it possible to give in black and white some indication of the color effects obtained by mixing pigments of different colors or superimposing impressions of different colored inks. In the drawing.

Figure 2:
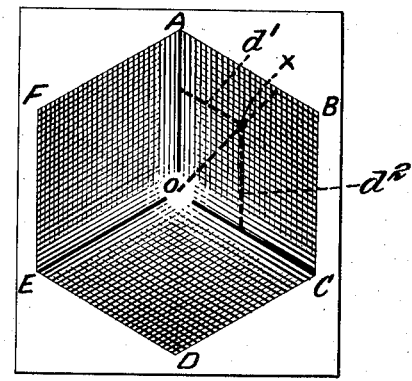
Fig. 2 is a face view of a color chart embodying the invention having a continuous color series varying by imperceptible gradations.

The color chart shown in Fig. 2 has the shape of a regular hexagon ABCDEFA. At the peripheral portion of the hexagon at the corner A is shown the yellow color of a pigment which absorbs a narrow band of light in the blue part of the spectrum. At the corner C is the bluish-green color of a pigment which absorbs a narrow band in the red part of the spectrum, and, at the corner E, the purple color of a pigment which absorbs a narrow band in the green part of the spectrum. Radial reference lines, OA, OC and OE are drawn on the chart to these three corners. From the corner A to the corner C is a graduated series of the pure colors which can be produced by different mixtures of the blue-absorbing pigment whose color is shown at A and the red-absorbing pigment whose color is shown at C. At the middle of the series, at the corner B, is shown the green color which is produced by mixing equal parts of the red-absorbing and blue-absorbing pigments. Between the corners A and B in the series are shown the colors obtained where the proportion of the blue-absorbing pigment is greater than the proportion of the red-absorbing pigment, while the colors where the red-absorbing pigment is in greater proportion than the blue-absorbing pigment are shown in the series between the corners B and C. The peripheral portion of the hexagon between the corners C and E shows in a similar way the colors obtained by mixtures of the red-absorbing pigment and the green-absorbing pigment, and the peripheral portion between the corners E and A shows a similar series of the colors obtained by mixtures of the green-absorbing pigment and the red-absorbing pigment.

Along each radial line from the periphery of the hexagon to its center is shown a series of colors of the same hue, but gradually diminishing in strength or density to white at the center. The radial series thus show the colors of reduced strength which may be obtained by mixing with the pigments necessary to produce the pure color at each point of the periphery varying proportions of a white colorless pigment.

The arrangement which has been described is such that the mixture of pigments required to produce the color shown at any point on the chart is indicated by the position of the point on the chart. Thus, any point on the periphery of the chart between the lines OA and OC may be obtained by mixing the pigments whose colors are shown at A and C in the proportion indicated by the nearness of the point to the lines OA and OC. In the case of colors indicated by points which are not at the periphery, the proportions of colored pigment to produce the required hue is indicated by the distances from the point to two of the reference lines, while the proportion of white to be added to obtain the required diminution in strength is indicated by the radial position of the point. Thus, to obtain the color shown at the point X on the chart shown in Fig. 2, a mixture is made of the blue-absorbing pigment whose color is shown at A and the red-absorbing pigment whose color is shown at C in about the proportion of four to three, as the distance $d'$ from the point X to the line OA measured parallel to the line OC, is about three-fourths of the distance $d^2$ from the point X to the line OC measured parallel to the line OA. To one part of this mixture of these two colored pigments must be added about one-half part of a white pigment, since the radial distance from the point X to the periphery is about one-half the radial distance from the point X to the center O.

Figure 1:
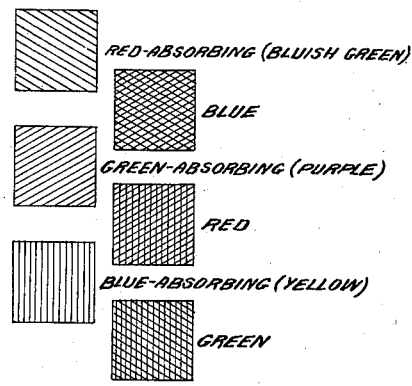
Fig. 1 is a chart of the color indications used in Figs. 2, 4 and 6.
Figure 3:
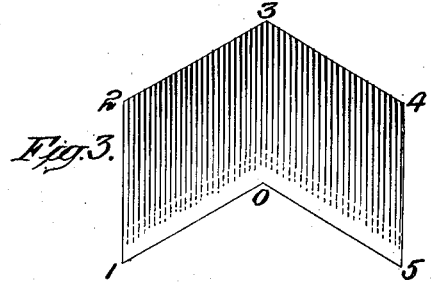
Fig. 3 shows a single impression of a printing member which may be used to make the chart shown in Fig. 2.

The color chart shown in Fig. 2 may be printed by three different colored overlapping impressions of a printing member, a single impression of which is shown in Fig. 3. The printing member has the shape of a figure 0—1—2—3—4—5—0 bounded by four sides 1—2, 2—3, 3—4, 4—5 and two radii 0—1, 0—5 of a regular hexagon and is so formed that the density of the ink layer produced by it is a minimum or zero along its concave base 1—0—5, and a maximum along its convex top 2—3—4. From the base to the top of the figure, the density increases gradually and regularly in a direction parallel to the center line 0—3 and outer sides 1—2, 5—4 of the figure. In making the chart shown in Fig. 1, the printing member whose impression is shown in Fig. 2 is inked with an ink containing a blue-absorbing pigment and impressed on the portion OEFABCO of the chart. It is then inked with an ink containing a red-absorbing pigment and impressed upon the portion OABCDEO of the chart, and then with a green-absorbing pigment and impressed upon the portion OCDEFAO of the chart. The variation of the density of the three ink layers in parallel lines has the effect of making the combined impression have a regular variation in hue around the periphery of the figure and a regular variation in strength or density along the radii of the figure.

Figure 4:
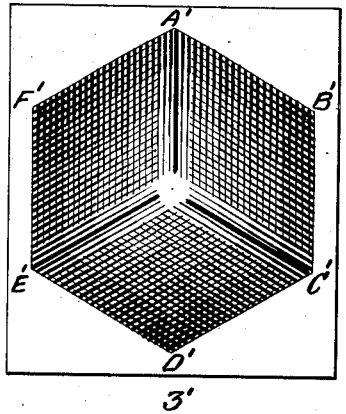
Fig. 4 is a face view of a modified color chart having series of colors varying by definite steps.
Figure 6:
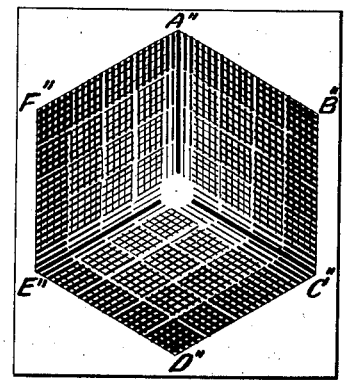
Fig. 6 is a face view of a color chart containing series of spaced spots of color.

The regular variation in hue along and parallel to the periphery and the regular variation in strength or density along the radii may be continuous or by imperceptible gradations as indicated in Fig. 2, or these regular variations may be continuous and by definite perceptible steps as shown in Fig. 4, or discontinuous and by steps as shown in Fig. 6.

Figure 5:
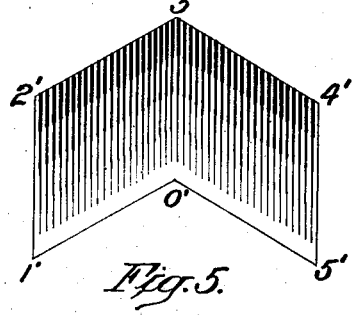
Fig. 5 shows a single impression of a printing member which may be used to make the chart shown in Fig. 4.

To produce a chart having step-by-step variation both in hue and in strength, use is made of a printing member producing an impression such as that shown in Fig. 5. In this impression, as in that shown in Fig. 3, there is a regular variation in density along lines parallel to the center line 0'—3', but this variation is by steps instead of by imperceptible gradations. The result of three overlapping different colored impressions of this printing member, as shown in Fig. 4, is to produce contiguous, diamond-shaped spots with a regular variation in hue from spot to spot along and parallel to the periphery of the hexagon, and a regular variation in strength or density from spot to spot along the radii of the hexagon.

Figure 7:
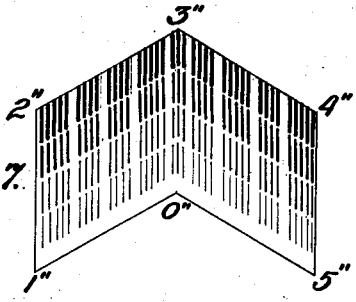
Fig. 7 shows a single impression of a printing member which may be used to make the color chart shown in Fig. 6.

The chart shown in Fig. 6 has similar hexagonal spots, but the spots are slightly separated instead of being contiguous. As shown in Fig. 7, the printing member for producing such a chart produces an impression consisting of separated diamond-shaped spots. The rows of spots extending parallel to the base 1″—0″—5″ and the top 2″—3″—4″ of the figure are each of uniform density, while the rows of spots extending parallel to the center line 0″—3″ increase regularly in density from spot to spot.

When great accuracy is required, there is an advantage in making a color chart with continuous gradual variation in hue and strength as indicated in Fig. 2. Where an approximate indication is required, it may be advantageous to use the form shown in Fig. 4 or the form shown in Fig. 6 in which definite spots of color may easily be seen. The size of these spots, as compared with the size of the hexagon, may be made either greater or less than shown in Figs. 4 and 6, as may be desired for particular uses.

What I claim is:

1. A color chart comprising a regular hexagon having along its periphery a graduated series of pure colors varying regularly in hue, and along its radii graduated series of colors of the same hue varying regularly in strength, and three reference lines extending from the center of the hexagon to equally spaced corners thereof so that the relation between the distances from any point on the chart to the two nearest reference lines, measured parallel to adjacent sides of the hexagon, indicates the proportions in which pigments of the colors at the outer ends of said two reference lines should be mixed to produce the color at said point.

2. A color chart comprising a regular hexagon having along its periphery a continuous series of pure colors varying regularly in hue by imperceptible gradations, and along its radii continuous series of colors of the same hue varying regularly in strength by imperceptible gradations, and three reference lines extending from the center of the hexagon to equally spaced corners thereof so that the relation between the distances from any point on the chart to the two nearest reference lines, measured parallel to adjacent sides of the hexagon, indicates the proportions in which pigments of the colors at the outer ends of said two reference lines should be mixed to produce the color at said point.

3. A color chart comprising a regular hexagon having along its periphery a continuous series of pure colors varying regularly in hue by definite steps, and along its radii continuous series of colors of the same hue varying regularly in strength by corresponding definite steps, and three reference lines extending from the center of the hexagon to equally spaced corners thereof so that the relation between the distances from any point on the chart to the two nearest reference lines, measured parallel to adjacent sides of the hexagon, indicates the proportions in which pigments of the colors at the outer ends of said two reference lines should be mixed to produce the color at said point.

4. A color chart comprising a regular hexagon having along its periphery a discontinuous series of pure colors varying regularly in hue by definite steps, and along its radii discontinuous series of colors of the same hue varying regularly in strength by corresponding definite steps, and three reference lines extending from the center of the hexagon to equally spaced corners thereof so that the relation between the distances from any point on the chart to the two nearest reference lines, measured parallel to adjacent sides of the hexagon, indicates the proportions in which pigments of the colors at the outer ends of said two reference lines should be mixed to produce the color at said point.

5. A color chart comprising a regular hexagon bearing diamond-shaped spots of color having a regular variation in hue from spot to spot in directions parallel to the periphery of the hexagon, and a regular variation in strength from spot to spot along the radii of the hexagon.

6. A color chart comprising a regular hexagon bearing contiguous diamond-shaped spots of color having a regular variation in hue from spot to spot in directions parallel to the periphery of the hexagon, and a regular variation in strength from spot to spot along the radii of the hexagon.

7. A color chart comprising a regular hexagon bearing spaced diamond-shaped spots of color having a regular variation in hue from spot to spot in directions parallel to the periphery of the hexagon, and a regular variation in strength from spot to spot along the radii of the hexagon.

8. A color chart having the form of a regular hexagon and containing colors produced by three pigments, each of which is applied to an area of the hexagon enclosed by four sides and two radii of the hexagon and varies regularly in density along lines parallel to the center line of said area, said three areas being so positioned that their center lines lie on three radii of the hexagon, extending to three equally spaced corners thereof.

9. A color chart having the form of a regular hexagon and containing colors produced by three pigments which absorb respectively narrow bands of the red, green and blue parts of the spectrum, and each of which is applied to an area of the hexagon enclosed by four sides and two radii of the hexagon and varies regularly in density along lines parallel to the center line of said area, said three areas being so positioned that their center lines lie on three radii of the hexagon, extending to three equally spaced corners thereof.

10. A color chart having the form of a regular hexagon and containing colors produced by three pigments, each of which is applied to an area of the hexagon enclosed by four sides and two radii of the hexagon and varies regularly in density by imperceptible gradations along lines parallel to the center line of said area, said three areas being so positioned that their center lines lie on three radii of the hexagon, extending to three equally spaced corners thereof.

11. A color chart having the form of a regular hexagon and containing colors produced by three pigments, each of which is applied to an area of the hexagon enclosed by four sides and two radii of the hexagon and varies regularly in density by definite visible steps along lines parallel to the center line of said area, said three areas being so positioned that their center lines lie on three radii of the hexagon, extending to three equally spaced corners thereof.

12. A color chart having the form of a regular hexagon and containing colors produced by three pigments, each of which is applied to an area of the hexagon enclosed by four sides and two radii of the hexagon in separated diamond-shaped spots and varies regularly in density from spot to spot along lines parallel to the center line of the area, said three areas being so positioned that their center lines lie on three radii of the hexagon, extending to three equally spaced corners thereof.

13. A color chart having the form of a regular hexagon containing colors produced by three pigments, each of which is applied to an area of the hexagon enclosed by four sides and two radii of the hexagon, and varies regularly in density along lines parallel to the center line of said area from a minimum density at the concave base of the area to a maximum density at the convex top of the area, said three areas being so positioned that their center lines lie on three radii of the hexagon, extending to three equally spaced corners thereof.

14. A color chart having the form of a regular hexagon and containing colors produced by three pigments which absorb respectively narrow bands of the red, green and blue parts of the spectrum, and each of which is applied to an area of the hexagon enclosed by four sides and two radii of the hexagon and varies regularly in density along lines parallel to the center line of said area from a minimum density at the concave base of the area to a maximum density at the convex top of the area, said three areas being so positioned that their center lines lie on three radii of the hexagon, extending to three equally spaced corners thereof.

15. A method of making a color chart which comprises making an impression of one color in the shape of a figure formed by four sides and two radii of a regular hexagon and varying regularly in density along lines parallel to the center line of said figure, making a similar impression of a different colored ink positioned so that one-half of it overlies one-half of the first impression, and making a similar third impression with a third colored ink in a position in which one-half of it overlies the first impression and the other half of it overlies the second impression.

16. A method of making a hexagonal color chart which comprises making an impression with a pigment absorbing a narrow band of the red part of the spectrum in the shape of a figure formed by four sides and two radii of a regular hexagon, and varying regularly in density along lines parallel to the center line of said figure, making a similar impression with a pigment absorbing a narrow band in the green part of the spectrum so positioned that one-half of it overlies one-half of the first impression, and making a similar third impression with a pigment absorbing a narrow band of the blue part of the spectrum so positioned that one-half of it overlies the first impression and the other half of it overlies the second impression.

HERBERT E. IVES.